United States Patent

[11] 3,614,120

| | | |
|---|---|---|
| [72] | Inventor | Frank Cicero<br>217 South Berendo St., Los Angeles, Calif. 90004 |
| [21] | Appl. No. | 828,834 |
| [22] | Filed | May 29, 1969 |
| [45] | Patented | Oct. 19, 1971 |

[54] FARM EQUIPMENT
2 Claims, 6 Drawing Figs.
[52] U.S. Cl. .................................................. 280/32.5
[51] Int. Cl. .................................................. B62m 1/00
[50] Field of Search ......................................... 280/32.5, 32.6; 180/29

[56] References Cited
UNITED STATES PATENTS
2,430,662  11/1947  Barton ........................ 280/32.6
2,509,934  5/1950  Murray ......................... 280/32.6
2,796,155  6/1957  Cabler ......................... 280/32.5
3,172,679  3/1965  Bandini ........................ 280/32.5

*Primary Examiner*—Benjamin Hersh
*Assistant Examiner*—Robert R. Song

ABSTRACT: A farm "Chair Cycle," having the frame and related supports preferably of tubular material, whereupon a worker or rider may sit and propel himself with his feet on the ground to pick low-growing fruits and even weeds and crawlers (if herbicides and pesticides were outlawed). The chair is supported by one back wheel, its axle transversing at about the seat bottom level a horizontal U-shaped frame, and by a front wheel mounted underneath a rider's knees on an axle carried by a pair wheel legs protruding from the seat bottom. The front wheel assemblage is firm, whereas the rear one should be pivotal.

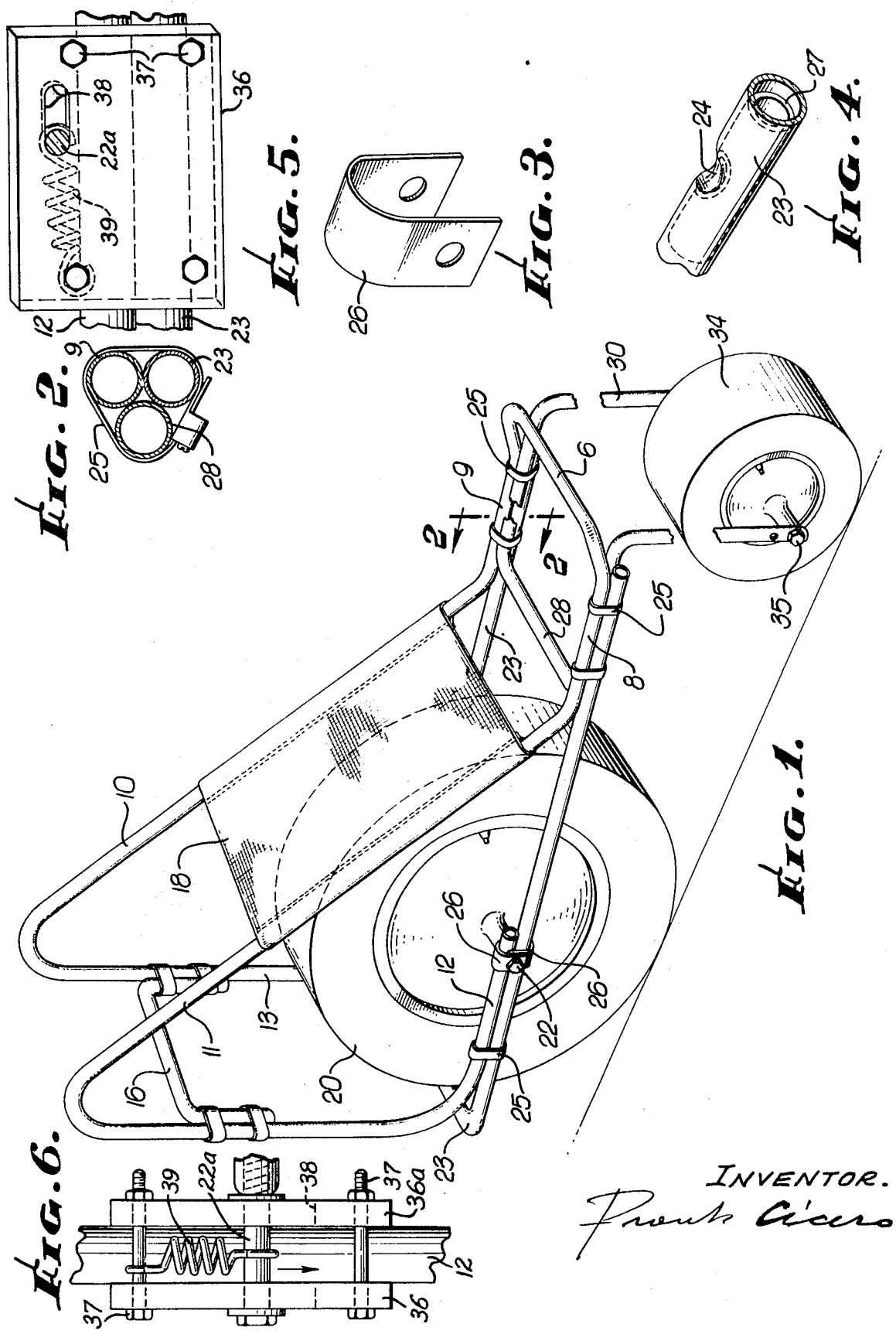

FARM EQUIPMENT

This application is for an improvement in "Farm Equipment" of my application Ser. No. 669,365 filed Sept. 19, 1967, and generally relates to farm vehicles or implements or moving supports used in fields to pick or gather fruits off low-growing plants such as strawberries, or to plant or to thin or care for same in a sedentary position. The intention of my invention is to provide a vehicle that is a compact and lightweight cycle having one wheel, or wheel with a tire, in front and one in back of a near-ground-level seat. The vehicle is easily set in motion by the rider with his heels pushing against the ground, the front wheel being located underneath his knees and out of the way. Another intention is to provide a vehicle that essentially consists of a chair or seat or molded seat mounted on two longitudinal wheels, the seat having preferably a reclined backrest for a comfortable position, adaptability to field requirements and easy reach. A further intention is to provide a vehicle that normally should be pushed backwardly by the rider himself, however he may also pull himself forwardly with the aid of a heel-hoe attachment or a metal blade sticking out of his shoe heels. The main achievement of my invention consists in providing a compact moving support which allows one rider by himself to move or propel himself along a single field furrow however the farmer may tie up two cycles together with a pole at the back for teamwork.

In the annexed drawing which illustrates an approximate and preferred tubular construction:

FIG. 1 is a full or perspective view of my chain cycle in upright position as seen when looking down at it while standing nearby.

FIG. 2 is a sectional view as taken through one side of the vehicle seat bottom in FIG. 1.

FIG. 3 shows in perspective view the upper half of a fastening band which firmly holds two tubes one on top of another.

FIG. 4 shows in perspective view a section of the aforesaid bottom tube as if taken out of the axle end assemblage.

When using my two-wheels cycle or chair cycle, a rider can easily swing or turn the cycle to one side by grabbing with his hands and holding still the wheel behind his back and while then pushing against the backrest the front wheel from the ground. The cycle may have a swivel front wheel specially if not used in furrows.

The main seat frame is bent in one piece metal tubing and includes: an upstanding latitudinal front end portion 6 adaptable to keep the rider from sliding off the seat, two longitudinal parallel seat bottom portions 8-9, two parallel reclined backrest portions 10-11, and two parallel L-shaped wheel brackets or legs 12-13 descending from the upper end of the backrest tubing. An inverted wide U-shaped piece tubing 16 is fastened between the L-brackets for reinforcing purpose. A webbing 18 is stretched across the backrest tubes. The upper half of the rear wheel 20 is located on center behind the backrest. The rear wheel could be smaller than shown and even so small as the front wheel and axled at the same level. The tires need not necessarily have such a wide and flat surface as shown. The wheel axle has the ends threaded inside and is carried by bolts 22 inserted between the end of the lower portion of the wheel brackets 12-13 and the legs of a long U-shaped frame 23. This axle must be placed as close as possible to the backrest so that the big wheel may support more weight. A transverse groove 24, as seen in FIG. 4, is pressed on the tubes 12 and 23 one facing the other at the axle ends assemblage. The reinforcing member 23 is attached underneath to the wheel brackets 12-13 and to the seat bottom tubing 8-9 by means of adjustable metal bands 25. Also I prefer to provide a pair of U-shaped wider metal bands 26, see also FIG. 3, one inverted and placed over the brackets 12-13 and the other under the member 23 on both sides. These bands have an aperture on its sides, wherethrough the bolts 22 are inserted, thereby making in effect a continuous band surrounding tightly the upper and lower tubes, provided the center-to-center distance between the holes on the bands 26 is slightly less than required to go around the tubes. A hole drilled through the walls of the two tubes would cause them to come apart after some time of vibration. I prefer to provide a tubular insert 27 which has a cutout groove bedding the groove 24. The seat bottom is conformed, and comfortably slanted at the sides, by a front wheel supporting frame 28 U-shaped and having the ends turned down and forwardly forming the front wheel legs 30, see also FIG. 2. The front wheel 34 is carried by an axle mounted on the wheel legs below the seat level by means of two bolts 35, threaded into the ends of the wheel axle. It should be noted that the rider may well carry a strawberry box or bag on a pillow roll resting on his lap, however the vehicle as shown lends itself to related suitable attachments.

Moreover I prefer to provide my vehicle with a device or arrangement whereby a limited or corrective steering may be obtained in a field furrow by the rider if he pushes to either side the tire of the rear wheel with his hand while slowly moving backwardly. FIG. 5 shows an elevation view and FIG. 6 the top view of said steering arrangement, in which 36 and 36a are a pair of vertical plates fastened by means of four bolts 37 and each side of the wheel brackets 12 and the sides of the reinforcing member 23. The plates are provided with an oblong aperture 38 just above the brackets 12 parallel thereto. A bolt 22a is shown, in FIG. 5 only, with the head sawed off and replaces the shorter bolt 22 in FIG. 1. An extension spring 39 is located between the plates and has one end hooked around the axle bolt 22a and the other around one of the fastening bolts 37 in order to pull back the axle end when the cycle rider stops pushing the tire to one side or swinging the wheel to steer the vehicle straight if necessary once he is in the furrow such as those in a strawberry field. Furthermore it should be noted that the rear axle end assemblage shown in FIGS. 5-6 clearly suggests to anyone skilled in the art that a hand lever can readily be installed to push forward the axle ends for easier steering or to reduce the strength otherwise required to push by hand the tire to one side.

While I have shown herein my farm chair cycle as embodied in preferred forms of construction, by way of example, it will be apparent that modifications might be made in the structure and that other materials and methods may be used without departing from the spirit of the invention. Consequently I do not wish to be limited in this respect but desire to be afforded the full scope of the appended claims.

I claim as my invention:

1. A moving support comprising a horizontally disposed tubular forwardly opening U-shaped frame, a vertically extending tubular L-shaped frame member secured to each leg of said frame adjacent the rear portion thereof, a rear wheel axle extending transversely of said frame, a wheel mounted on said axle between the legs of said frame, a seat mounted at the forward end of the frame forwardly of said wheel and at the same level as said rear wheel axle, a front wheel supporting frame extending downwardly and outwardly from the forward end of said frame below the seat and carrying a front wheel axled below the seat level.

2. A moving support as defined in claim 1, the upper end of said L-shaped members having downwardly and forwardly extending portions for supporting a seat back therebetween, the lower ends of said portions secured to the respective legs of said U-shaped frame adjacent the seat.